(12) United States Patent
Aoki

(10) Patent No.: US 10,701,251 B2
(45) Date of Patent: Jun. 30, 2020

(54) IMAGING OPTICAL SYSTEM, IMAGE PROJECTION APPARATUS, AND CAMERA SYSTEM

(71) Applicant: CANON KABUSHIKI KAISHA, Tokyo (JP)

(72) Inventor: Koji Aoki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/247,940

(22) Filed: Jan. 15, 2019

(65) Prior Publication Data

US 2019/0222728 A1 Jul. 18, 2019

(30) Foreign Application Priority Data

Jan. 16, 2018 (JP) ................. 2018-004641

(51) Int. Cl.
| | |
|---|---|
| *H04N 5/225* | (2006.01) |
| *G02B 17/08* | (2006.01) |
| *G02B 27/00* | (2006.01) |
| *G03B 21/20* | (2006.01) |
| *G02B 13/00* | (2006.01) |
| *G02B 5/08* | (2006.01) |

(52) U.S. Cl.
CPC ............ *H04N 5/2254* (2013.01); *G02B 5/08* (2013.01); *G02B 17/0848* (2013.01); *H04N 5/2253* (2013.01); *G02B 27/0025* (2013.01)

(58) Field of Classification Search
None
See application file for complete search history.

(56) References Cited

U.S. PATENT DOCUMENTS

| | | | |
|---|---|---|---|
| 9,921,409 B2 | 3/2018 | Aoki | |
| 9,939,634 B2 | 4/2018 | Aoki | |
| 2007/0153398 A1* | 7/2007 | Shafer | .............. G02B 13/22 |
| | | | 359/649 |
| 2015/0185493 A1 | 7/2015 | Aoki | |
| 2018/0003929 A1 | 1/2018 | Aoki | |

FOREIGN PATENT DOCUMENTS

| | | |
|---|---|---|
| JP | 2013037371 A | 2/2013 |
| JP | 2017040849 A | 2/2017 |
| JP | 2017219741 A | 12/2017 |

* cited by examiner

*Primary Examiner* — Mark T Monk
(74) *Attorney, Agent, or Firm* — Carter, DeLuca & Farrell LLP

(57) ABSTRACT

An imaging optical system includes, in order from an enlargement conjugate side to a reduction conjugate side, a first mirror as a convex mirror, a first lens unit, a second mirror as a concave mirror, a third mirror as a concave mirror, and a second lens unit. The imaging optical system is configured to form a first intermediate real image and a second intermediate real image located at a position different from that of the first intermediate real image between the first mirror and a reduction side conjugate plane.

15 Claims, 6 Drawing Sheets

IMAGING OPTICAL SYSTEM, IMAGE PROJECTION APPARATUS, AND CAMERA SYSTEM

BACKGROUND OF THE INVENTION

Field of the Invention

The present invention relates to an optical system suitable for a projection optical system in an image projection apparatus (projector) and an imaging optical system in an imaging apparatus (camera).

Description of the Related Art

A projection optical system in a projector is demanded for a wide angle and a short projection distance. Depending on an application, an imaging optical system in a camera may be required for a wide angle and a short imaging distance. Japanese Patent Laid-Open No. ("JP") 2017-40849 discloses a projection optical system that includes a refractive optical system having a positive power and a reflective optical system having three reflective surfaces and can provide a proximity projection.

However, the projection optical system disclosed in JP 2017-40849 is large in a radial direction and demanded for a compact configuration.

SUMMARY OF THE INVENTION

The present invention provides a compact imaging optical system and the like that has a wide angle, a short projection or imaging distance, and a good optical performance.

An imaging optical system according to one aspect of the present invention includes, in order from an enlargement conjugate side to a reduction conjugate side, a first mirror as a convex mirror, a first lens unit, a second mirror as a concave mirror, a third mirror as a concave mirror, and a second lens unit. The imaging optical system is configured to form a first intermediate real image and a second intermediate real image located at a position different from that of the first intermediate real image between the first mirror and a reduction side conjugate plane.

An image projection apparatus according to another aspect of the present invention includes a light modulation element, a light source configured to illuminate the light modulation element, and a projection optical system as the above imaging optical system configured to project light from the light modulation element disposed on a reduction conjugate plane onto a projection surface on an enlargement conjugate side.

A camera system according to another aspect of the present invention includes an imaging surface, an image sensor configured to hold the imaging surface, and an imaging optical system as the above imaging optical system configured to form an optical image on the imaging surface disposed on the reduction conjugate plane.

Further features of the present invention will become apparent from the following description of exemplary embodiments with reference to the attached drawings.

DESCRIPTION OF THE EMBODIMENTS

Figure 1:
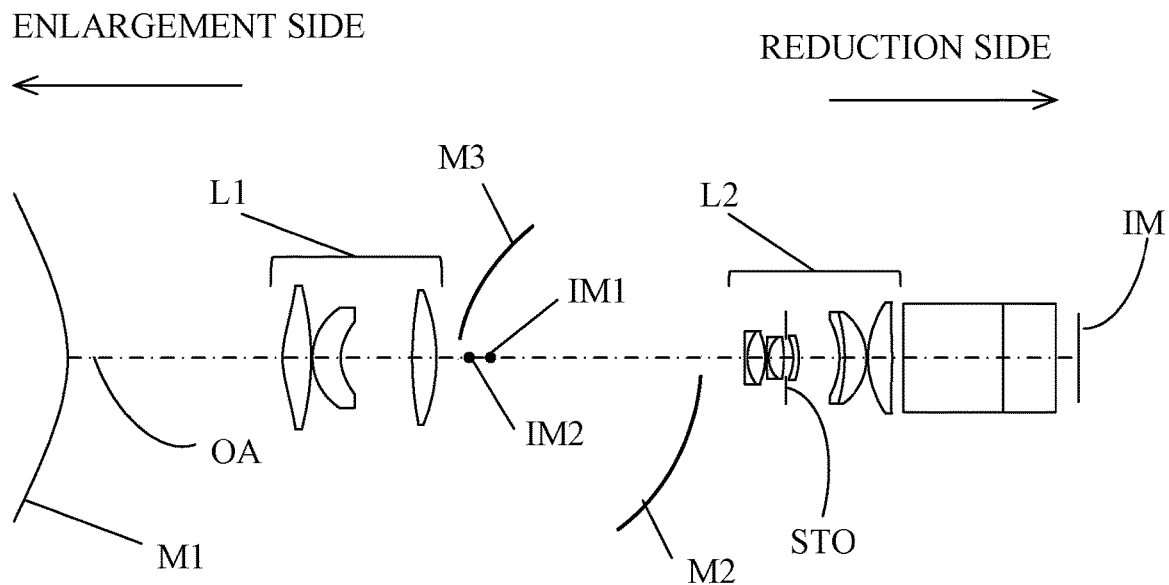
FIG. 1 is a sectional view illustrating a configuration of an imaging optical system according to Example 1 (numerical example 1) of the present invention.

Referring now to the accompanying drawings, a description will be given of embodiments of the present invention. Referring now to FIG. 1 illustrating the imaging optical system according to Example 1, a description will be given of a basic configuration of an imaging optical system according to each example. The imaging optical system according to each embodiment includes, in order from an enlargement conjugate side to a reduction conjugate side on an optical path, a first (reflecting) mirror M1 as a convex mirror, a first lens unit L1, a second (reflecting) mirror M2 as a concave mirror, a third (reflecting) mirror M3 as a concave mirror, and a second lens unit L2. A first intermediate real image IM1 and a second intermediate real image IM2 are formed between the first mirror M1 and a reduction side conjugate plane IM.

The imaging optical system having such a configuration can make the powers of each mirror and each lens unit larger, and the entire imaging optical system more compact. The first mirror M1 as a convex mirror disposed on the enlargement conjugate side can realize a wide angle and a short projection or imaging distance. Furthermore, the second mirror M2 and the third mirror M3 both as concave mirrors can increase the correction freedom of the Petzval's sum and satisfactorily correct the astigmatism.

In addition, the first intermediate real image IM1 and the second intermediate real image IM2 formed between the first mirror M1 and the reduction side conjugate plane IM images light three times from the first mirror M1 to the reduction side conjugate plane IM, and can satisfactorily correct the distortion which is likely to increase as the wide angle is promoted.

The imaging optical system according to each embodiment may arrange the first and second lens units L1 and L2 on a common optical axis OA. This configuration can make the entire imaging optical system compact and the configuration simple. While each of the first and second lens units L1 and L2 may include only a single lens, at least one lens unit may be a coaxial optical system including a plurality of lenses. This configuration can correct the coma aberration and the chromatic aberration of magnification (lateral chromatic aberration).

In the imaging optical system according to each embodiment, at least one of the first and second intermediate real images IM1 and IM2 may be formed between the first lens unit L1 and the second lens unit L2. This configuration can well correct the distortion and the lateral chromatic aberration. Furthermore, the first and second intermediate real images IM1 and IM2 may be formed between the second mirror M2 and the third mirror M3.

The imaging optical system according to each embodiment may satisfy at least one of the following conditions expressed by expressions (1) to (6). In the expressions (1) to (4), fM1 represents a focal length of the first mirror M1, fM2 represents a focal length of the second mirror M2, fM3 represents a focal length of the third mirror M3, fL1 represents a focal length of the first lens unit L1, and fL2 represents a focal length of the second lens unit L2.

$$0.50 \leq |fL1/fM1| \leq 5.00 \qquad (1)$$

If the value of |fL1/fM1| in the expression (1) exceeds the upper limit, the power of the first mirror M1 becomes too strong and it becomes difficult to correct the distortion and the astigmatism. On the other hand, if the value of |fL1/fM1| is less than the lower limit, the power of the first lens unit L1 becomes too strong and it becomes difficult to correct the coma aberration.

$$0.20 \leq |fM3/fL2| \leq 1.20 \qquad (2)$$

If the value of |fM3/fL2| exceeds an upper limit in the expression (2), the power of the second lens unit L2 becomes too strong and it becomes difficult to correct the coma aberration. If the value of |fM3/fL2| is less than the lower limit, the power of the third mirror M3 becomes too strong and it becomes difficult to correct the distortion and the astigmatism.

$$0.30 \leq |fM2/fL2| \leq 1.70 \qquad (3)$$

If the value of |fM2/fL2| exceeds the upper limit in the expression (3) in the expression (3), the power of the second lens unit L2 becomes too strong and it becomes difficult to correct the coma aberration. If the value of |fM2/fL2| exceeds the lower limit, the power of the second mirror M2 becomes too strong and it becomes difficult to correct the distortion and the astigmatism.

$$0.50 \leq fL1/fL2 \leq 2.70 \qquad (4)$$

If the value of fL1/fL2 exceeds the upper limit in the expression (4), the power of the second lens unit L2 becomes too strong and it becomes difficult to correct the coma aberration. If the value of fL1/fL2 is less than the lower limit, the power of the first lens unit L1 becomes too strong and it becomes difficult to correct the lateral chromatic aberration.

In the expressions (5) and (6), DM1IM represents a distance on the optical axis OA between the first mirror and the reduction side conjugate plane IM, and DM2M3 represents a distance between the second mirror M2 and the third mirror M3 on the optical axis OA.

$$0.10 \leq DM2M3/DM1IM \leq 0.60 \qquad (5)$$

If the value of DM2M3/DM1IM exceeds the upper limit in the expression (5) or the distance between the second and third mirrors M2 and M3 becomes too long, the powers of the second and third mirrors M2 and M3 become too weak and it becomes difficult to suppress their lengths in the radial direction. When the value of DM2M3/DM1IM is less than the lower limit or the distance between the first mirror M1 and the reduction side conjugate plane IM becomes too long and the total length of the imaging optical system increases.

$$0.15 \leq |fM1/DM1L1| \leq 1.60 \qquad (6)$$

When the value of |fM1/DM1L1| exceeds the upper limit in the expression (6), the interval between the first mirror M1 and the first lens unit L1 becomes too small and it becomes difficult to secure a wide imaging area. If the value of |fM1/DM1L1| is less than the lower limit, the power of the first mirror M1 becomes too strong and it becomes difficult to correct the distortion and the astigmatism.

The following conditions expressed by expressions (1a) to (6a) may be satisfied by changing the upper limit and the lower limit in the expressions (1) to (6).

$$0.60 \leq |fL1/fM1| \leq 4.80 \qquad (1a)$$

$$0.25 \leq |fM3/fL2| \leq 1.10 \qquad (2a)$$

$$0.35 \leq |fM2/fL2| \leq 1.65 \qquad (3a)$$

$$0.60 \leq fL1/fL2 \leq 2.60 \qquad (4a)$$

$$0.13 \leq DM2M3/DM1IM \leq 0.55 \qquad (5a)$$

$$0.18 \leq |fM1/DM1L1| \leq 1.55 \qquad (6a)$$

The following conditions expressed by expressions (1b) to (6b) may be satisfied by changing the upper limit and the lower limit in the expressions (1a) to (6a).

$$0.70 \leq |fL1/fM1| \leq 4.60 \qquad (1b)$$

$$0.30 \leq |fM3/fL2| \leq 1.00 \qquad (2b)$$

$$0.40 \leq |fM2/fL2| \leq 1.60 \qquad (3b)$$

$$0.70 \leq fL1/fL2 \leq 2.50 \qquad (4b)$$

$$0.15 \leq DM2M3/DM1IM \leq 0.50 \qquad (5b)$$

$$0.20 \leq |fM1/DM1L1| \leq 1.50 \qquad (6b)$$

According to the imaging optical system in each embodiment, at least one of the first and second lens units L1 and L2 may include a diaphragm (or aperture stop). This configuration can satisfactorily correct the coma aberration, the lateral chromatic aberration, and the distortion. The aperture diameter in the diaphragm may be fixed or variable.

In the imaging optical system according to each embodiment, at least one of the first, second, and third mirrors M1, M2, and M3 has an aspheric shape. This configuration can correct a high-order component in the field of curvature.

Examples (numerical examples) of a specific imaging optical system will be described below.

Example 1

Figure 2:
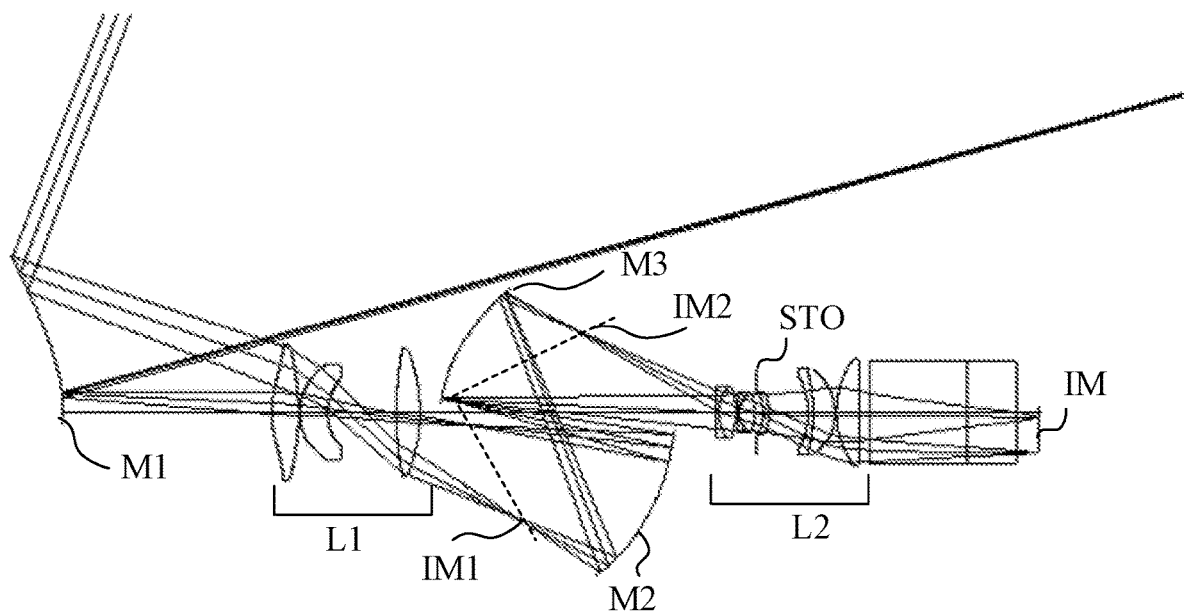
FIG. 2 is a ray trace diagram of the imaging optical system according to Example 1.

FIG. 1 illustrates an imaging optical system according to Example 1 (numerical example 1). FIG. 2 illustrates a ray trace passing through the imaging optical system according to Example 1. The imaging optical system according to this example is an optical system having an imaging magnification of about −0.0071×, an aperture ratio of about 2.42, and a half angle of view of about 69.86°. STO is a diaphragm (aperture stop) for determining (limiting) the light flux of the open F-number (Fno), and is provided in the second lens unit L2 in this example.

In FIGS. 1 and 2, IM1 and IM2 represent approximate positions of the first intermediate real image and the second intermediate real image, respectively. The first intermediate real image IM1 is formed between the first lens unit L1 and the second mirror M2 and the second intermediate real image IM2 is formed between the third mirror M3 and the second lens unit L2. Moreover, the first and second intermediate real images IM1 and IM2 are formed between the second mirror M2 and the third mirror M3. This is also applied to the following other examples.

Disposed on the reduction side conjugate plane IM is an optical modulation surface of a light modulation element (optical modulator), such as a liquid crystal display element and a digital micromirror device, when the imaging optical system is used for a projection optical system in a projector. The imaging optical system when used for a camera is disposed on an imaging surface on an image sensor (photoelectric conversion element), such as a CCD sensor or a CMOS sensor. This is also applied to the following other examples.

Figure 3:
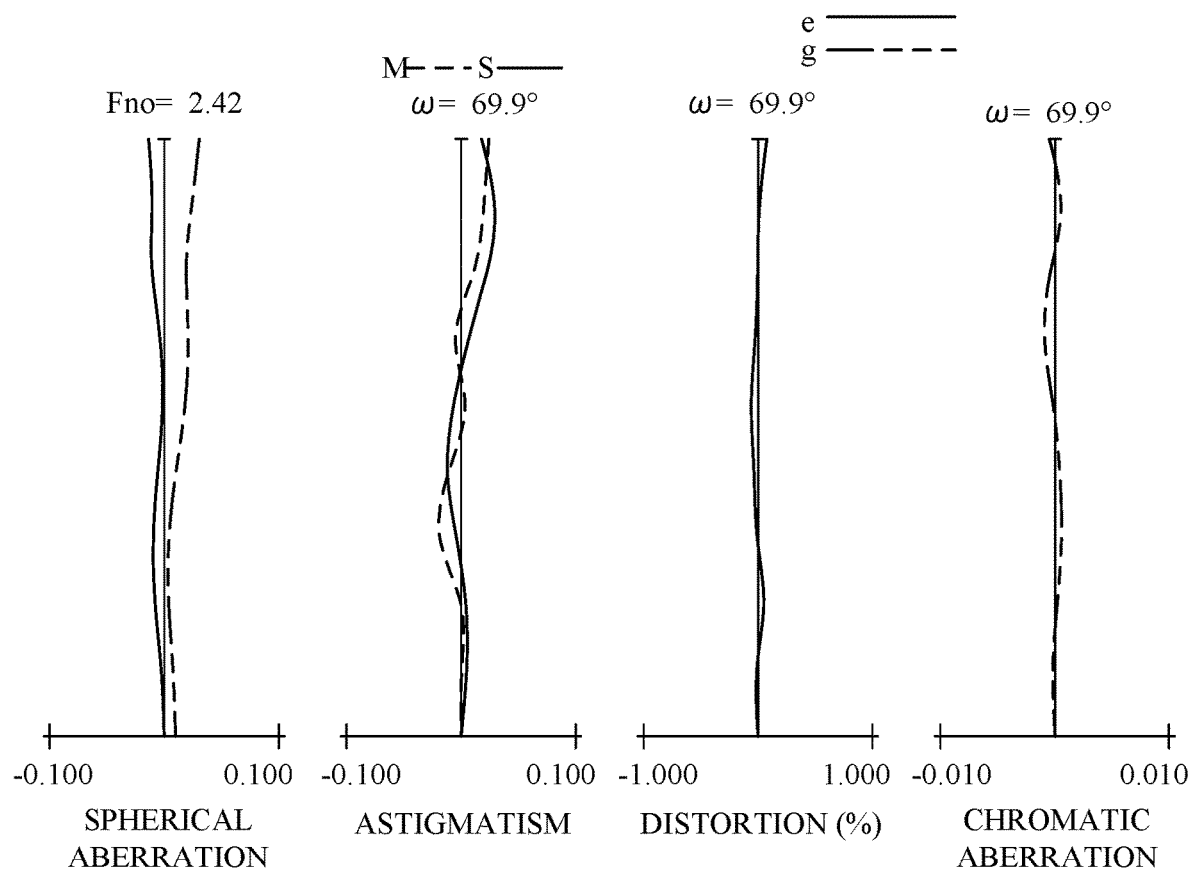
FIG. 3 is a longitudinal aberration diagram of the imaging optical system according to Example 1.

Table 1 shows optical data of the imaging optical system according to this example. FIG. 3 is a longitudinal aberration diagram of the imaging optical system according to this example, illustrating the spherical aberration, the astigmatism, the distortion, and the lateral chromatic aberration in order from the left side. In the spherical aberration, the distortion, and the lateral chromatic aberration, a solid line corresponds to the e-line (wavelength 546 nm), and an alternate long and two short dashes line corresponds to the g-line (wavelength 436 nm). In the astigmatism, a broken line represents the astigmatism on a meridional section, and the solid line represents the astigmatism on a sagittal section. This is similarly applied to the following other embodiments.

Example 2

Figure 4:
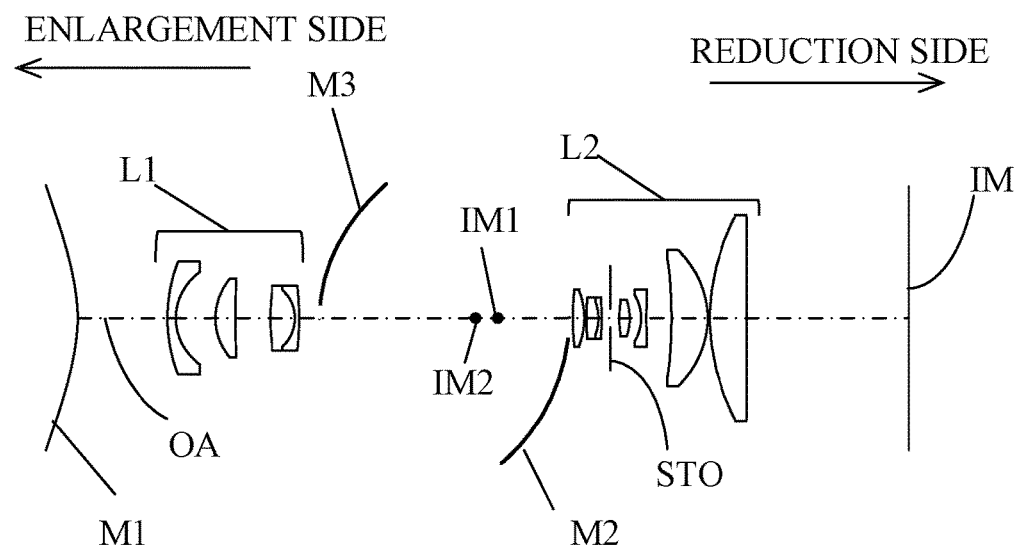
FIG. 4 is a sectional view illustrating a configuration of an imaging optical system according to Example 2 (numerical example 2) of the present invention.
Figure 5:
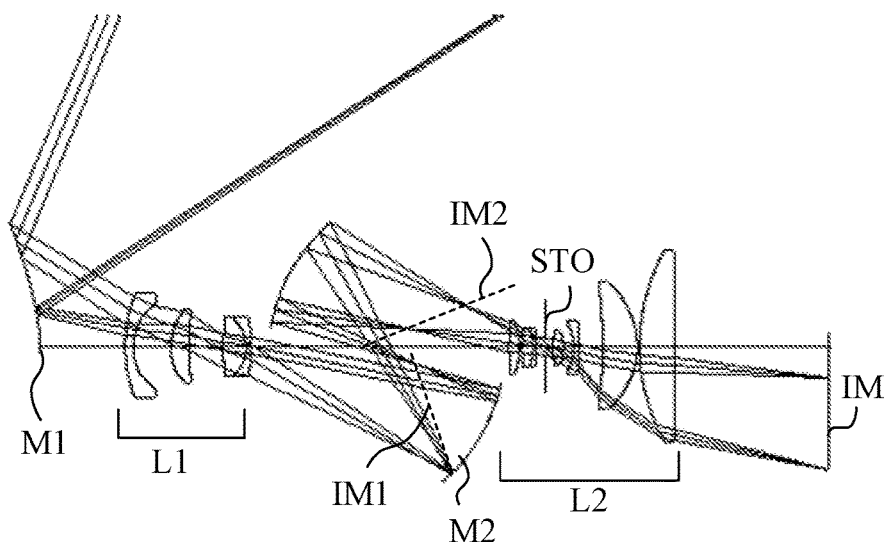
FIG. 5 is a ray trace diagram of the imaging optical system according to Example 2.
Figure 6:
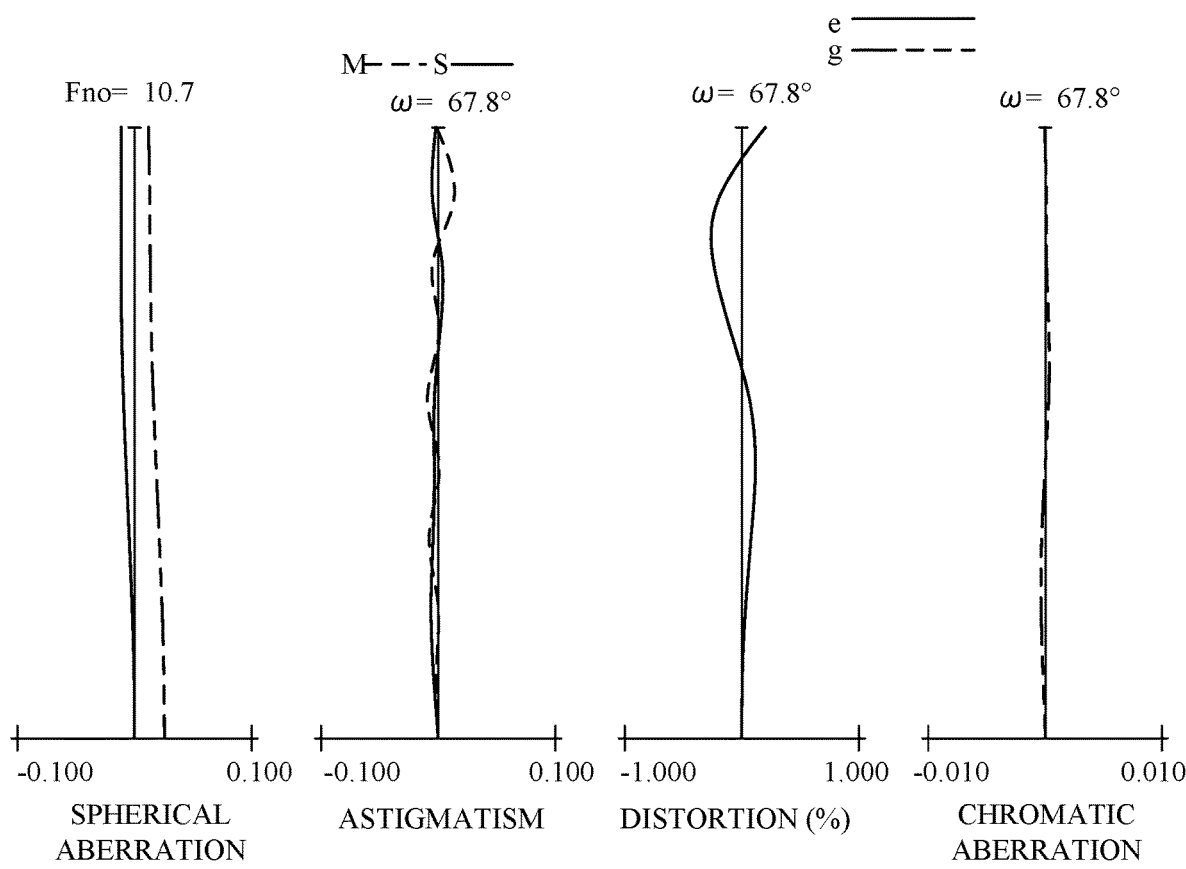
FIG. 6 is a longitudinal aberration diagram of the imaging optical system according to Example 2.

FIG. 4 illustrates an imaging optical system according to Example 2 (numerical example 2). FIG. 5 illustrates a ray trace passing through the imaging optical system according to Example 2. The imaging optical system according to this example is an optical system having an imaging magnification of about −0.0455×, an aperture ratio of about 10.69, and a half angle of view of about 67.76°. Also in this example, the aperture stop STO is provided to the second lens unit L2. Table 2 shows optical data of the imaging optical system according to this example. FIG. 6 is a longitudinal aberration diagram according to this example.

Example 3

Figure 7:
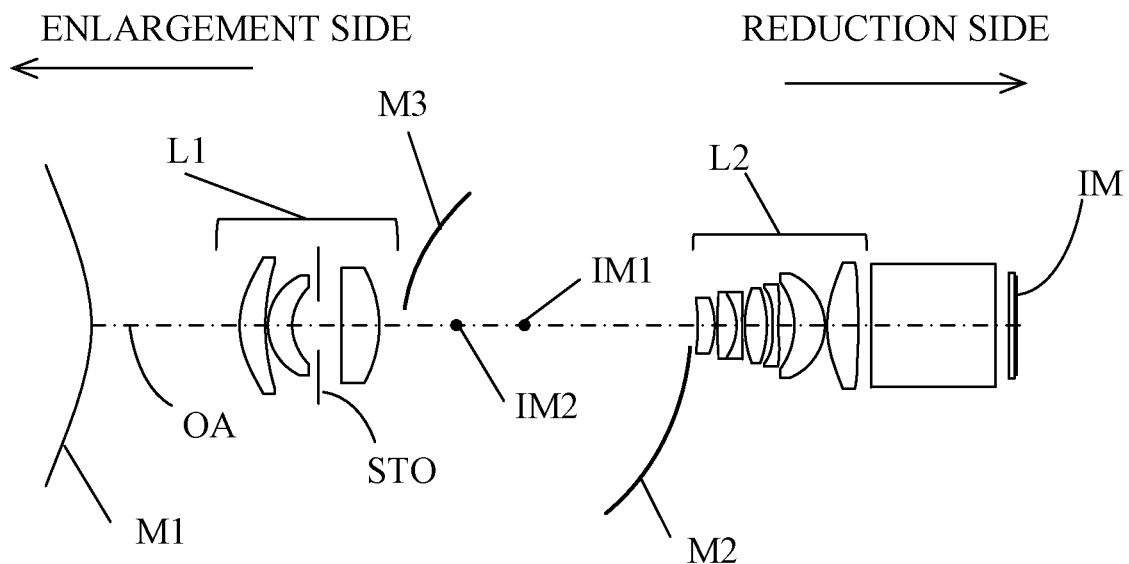
FIG. 7 is a sectional view illustrating a configuration of an imaging optical system according to Example 3 (numerical example 3) of the present invention.
Figure 8:
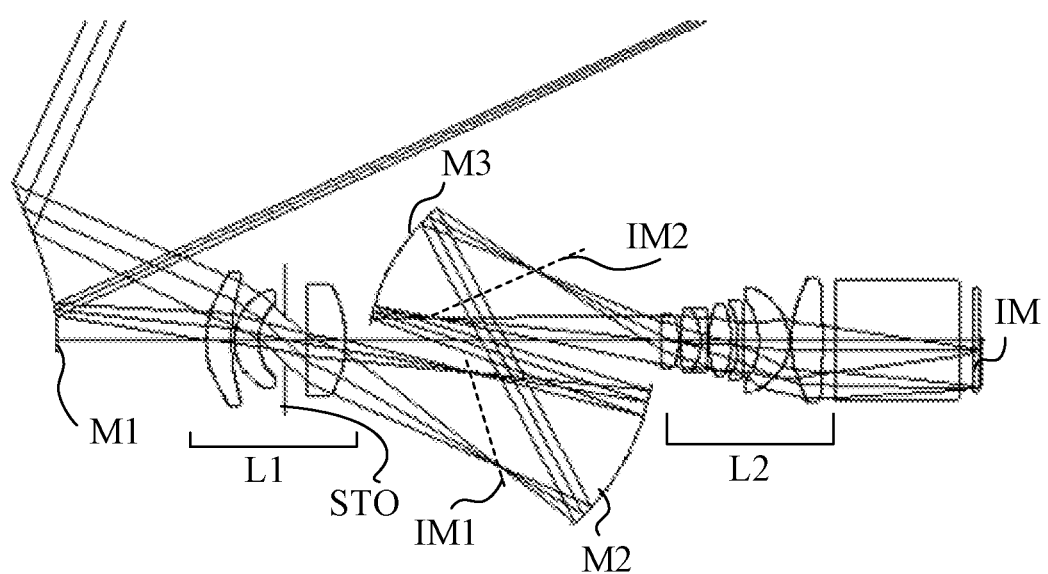
FIG. 8 is a ray trace diagram of the imaging optical system according to Example 3.
Figure 9:
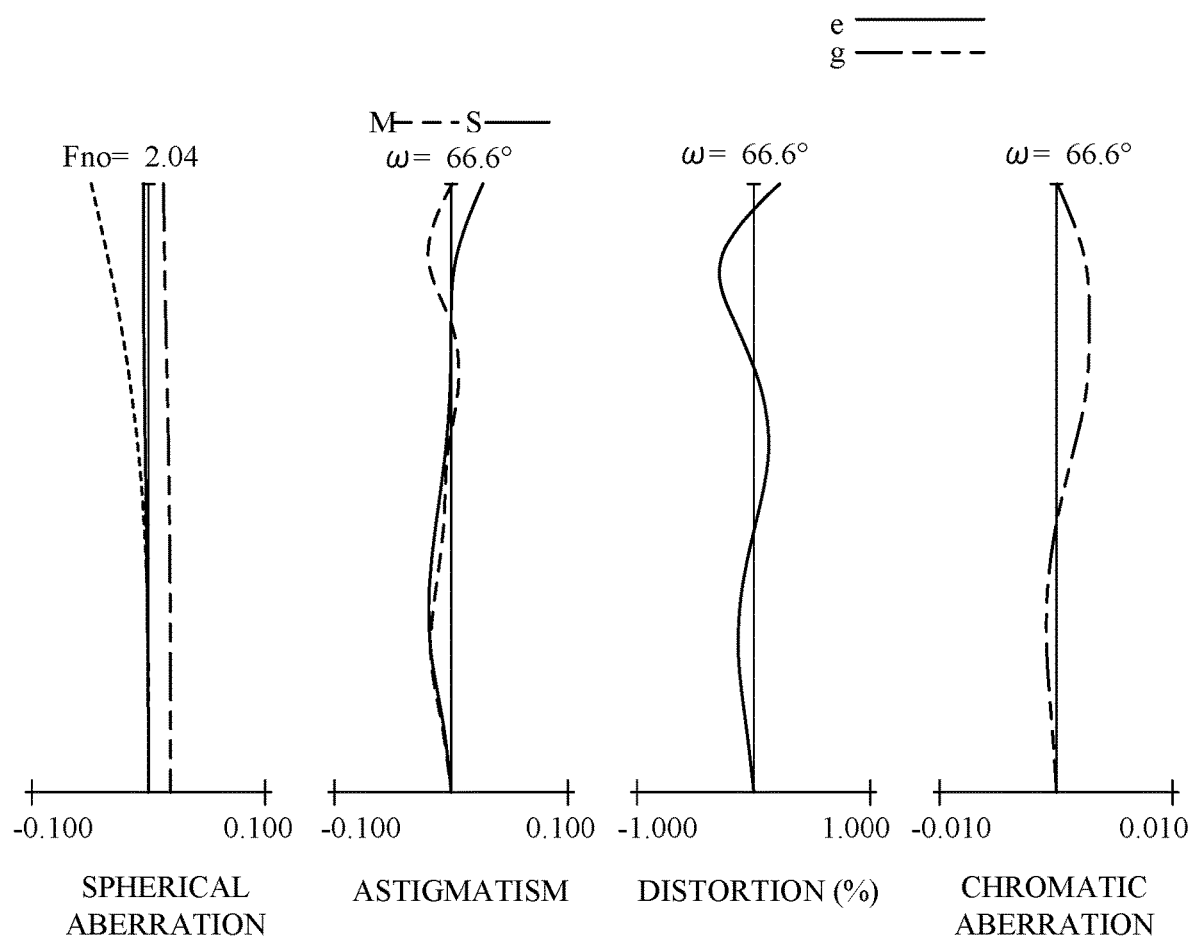
FIG. 9 is a longitudinal aberration diagram of the imaging optical system according to Example 3.

FIG. 7 illustrates an imaging optical system according to Example 3 (numerical example 3). FIG. 8 illustrates a ray trace passing through the imaging optical system according to Example 3. The imaging optical system according to this example is an optical system having an imaging magnification of about −0.0127×, an aperture ratio of about 2.04, and a half angle of view of about 66.56°. Table 3 shows optical data of the imaging optical system according to this example. FIG. 9 is a longitudinal aberration diagram according to this example.

In the optical data according to each example shown in Tables 1 to 3, the surface number i indicates the order of the surface from the enlargement conjugate side. ri denotes a radius of curvature of the i-th lens surface in order from the enlargement conjugate side. di is a distance (thickness) or air gap on the optical axis OA between the i-th surface and the (i+1)-th surface. ndi and vdi are the refractive index and the Abbe number for the d-line of the glass between the i-th surface and the (i+1)-th surface, respectively. The ndi of the mirror is denoted as "REF." In the surface number i, OB represents the magnification side conjugate plane and IM represents the reduction side conjugate plane.

An asterisked surface on the right side of the surface number has an aspheric shape. The position in the optical axis direction is X, the position in the direction orthogonal to the optical axis OA is H, the direction from the enlargement conjugate side to the reduction conjugate side is set to the positive, r is the paraxial radius of curvature, and K is the conic constant, A4, A6, A8, A10, A12, A14, and A16 are the aspheric coefficients, respectively. Then, the aspheric shape is represented by the following expression (7).

$$X = \frac{(1/R)H^2}{1 + \sqrt{1 - (1+K)(H/R)^2}} + A4 \times H^4 + A6 \times H^6 + A8 \times H^8 + A10 \times H^{10} + A12 \times H^{12} + A14 \times H^{14} + A16 \times H^{16} \tag{7}$$

TABLE 1

(NUMERICAL EXAMPLE 1)
UNIT mm

Surface data

| surface number | r | d | nd | vd |
|---|---|---|---|---|
| OB | | −814.00 | | |
| 1* | −61.242 | 80.00 | REF | |
| 2* | 35.980 | 10.56 | 1.58313 | 59.4 |
| 3 | −104.312 | 0.50 | | |
| 4 | 22.217 | 10.51 | 1.69350 | 53.2 |
| 5* | 16.065 | 26.56 | | |
| 6 | 134.522 | 9.01 | 1.49700 | 81.5 |
| 7 | −66.596 | 98.61 | | |
| 8* | −85.064 | −90.53 | REF | |
| 9* | 41.792 | 106.60 | REF | |
| 10 | 1445.244 | 1.00 | 1.69680 | 55.5 |
| 11 | 16.304 | 6.60 | 1.49700 | 81.5 |
| 12 | −23.497 | 0.50 | | |
| 13 | 101.331 | 0.80 | 1.69680 | 55.5 |
| 14 | 10.115 | 5.65 | 1.49700 | 81.5 |
| 15 | −44.933 | 0.70 | | |
| 16(diaphragm) | ∞ | 2.78 | | |

TABLE 1-continued (NUMERICAL EXAMPLE 1)
UNIT mm

| | | | | |
|---|---|---|---|---|
| 17* | −16.998 | 2.07 | 1.69350 | 53.2 |
| 18 | −26.145 | 15.06 | | |
| 19 | −30.443 | 2.00 | 1.64000 | 60.1 |
| 20 | −60.000 | 8.33 | 1.49700 | 81.5 |
| 21 | −20.734 | 0.50 | | |
| 22* | 34.236 | 8.98 | 1.55332 | 71.7 |
| 23* | −183.037 | 4.25 | | |
| 24 | ∞ | 37.00 | 1.51633 | 64.1 |
| 25 | ∞ | 19.50 | 1.84139 | 24.6 |
| 26 | ∞ | 8.42 | | |
| IM | ∞ | | | |

Aspheric data

First surface $K = -5.06577e+000$ $A4 = -5.54433e-007$ $A6 = 4.26538e-010$ $A8 = -2.01435e-013$
$A10 = 6.06752e-017$ $A12 = -1.12009e-020$ $A14 = 1.14888e-024$ $A16 = -4.99973e-029$
Second surface $K = 0.00000e+000$ $A4 = -1.72439e-005$ $A6 = 4.05597e-009$ $A8 = 4.08981e-012$
$A10 = -6.09906e-015$ $A12 = 1.53818e-018$
Fifth surface $K = 0.00000e+000$ $A4 = -6.85002e-005$ $A6 = 1.48243e-007$ $A8 = -1.11443e-009$
$A10 = 5.00563e-012$ $A12 = -1.46292e-014$
Eighth surface $K = -5.95405e-001$ $A4 = -1.54896e-007$ $A6 = -3.26964e-011$ $A8 = 1.79509e-014$
$A10 = -1.47280e-017$ $A12 = 5.49597e-021$ $A14 = -1.07739e-024$ $A16 = 8.03781e-029$
Ninth surface $K = -2.60249e+000$ $A4 = 1.08790e-006$ $A6 = 8.09243e-010$ $A8 = -1.08848e-012$
$A10 = 7.19396e-016$ $A12 = -2.72385e-019$ $A14 = 5.63530e-023$ $A16 = -4.92174e-027$
Seventeenth Surface $K = 0.00000e+000$ $A4 = 3.90680e-005$ $A6 = 7.94888e-010$ $A8 = 6.51397e-009$
$A10 = -9.45361e-011$ $A12 = 8.07063e-013$
Twenty-second surface $K = 0.00000e+000$ $A4 = -4.12995e-006$ $A6 = 5.99692e-009$ $A8 = -5.35015e-012$
$A10 = 7.48837e-015$
Twenty-third surface $K = 0.00000e+000$ $A4 = 2.62628e-006$ $A6 = 7.97612e-009$ $A8 = -6.47417e-012$
$A10 = 1.06162e-014$

VARIOUS DATA

| | |
|---|---|
| Focal length [mm] | 5.98 |
| F-number | 2.42 |
| Half angle of view [deg] | 69.86 |

TABLE 2

(NUMERICAL EXAMPLE 2)
UNIT mm

Surface data

| surface number | r | d | nd | vd |
|---|---|---|---|---|
| OB | | −266.00 | | |
| 1* | −41.479 | 21.13 | REF | |
| 2* | 36.148 | 2.00 | 1.55332 | 71.7 |
| 3 | 13.280 | 9.23 | | |
| 4 | 14.197 | 4.68 | 1.49700 | 81.5 |
| 5 | 180.072 | 8.22 | | |
| 6 | 45.961 | 5.70 | 1.49700 | 81.5 |
| 7 | −8.998 | 1.00 | 1.64000 | 60.1 |
| 8 | −69.938 | 63.37 | | |
| 9* | −43.136 | −58.58 | REF | |
| 10* | 35.931 | 59.44 | REF | |
| 11 | 66.892 | 2.71 | 1.49700 | 81.5 |

TABLE 2-continued (NUMERICAL EXAMPLE 2)
UNIT mm

| | | | | |
|---|---|---|---|---|
| 12 | −17.367 | 0.50 | | |
| 13 | 59.426 | 2.77 | 1.49700 | 81.5 |
| 14 | −10.565 | 0.80 | 1.77250 | 49.6 |
| 15 | −37.492 | 2.00 | | |
| 16(diaphragm) | ∞ | 2.09 | | |
| 17 | 25.405 | 2.43 | 1.49700 | 81.5 |
| 18 | −13.122 | 2.68 | | |
| 19* | −11.341 | 1.20 | 1.76802 | 49.2 |
| 20* | 59.474 | 5.92 | | |
| 21* | −72.691 | 8.51 | 1.55332 | 71.7 |
| 22* | −19.782 | 0.50 | | |
| 23 | 49.845 | 8.68 | 1.49700 | 81.5 |
| 24 | −19804.254 | 37.88 | | |
| IM | ∞ | | | |

Aspheric data

First surface

K = 0.00000e+000 A 4 = 1.09959e−005 A 6 = −9.15964e−009 A 8 = 8.48799e−012
A10 = −4.55328e−015 A12 = 1.35429e−018 A14 = −6.85422e−023
Second surface K = 0.00000e+000 A 4 = −1.92040e−006 A 6 = 5.88525e−009 A 8 = 3.76568e−011
A10 = 6.55132e−014
Ninth surface K = 4.72917e−002 A 4 = 8.28635e−007 A 6 = −7.88205e−011 A 8 = −4.63895e−014
A10 = 9.27697e−016 A12 = −1.63222e−018 A14 = 1.34484e−021 A16 = −4.63103e−025
Tenth surface K = −7.67286e−001 A 4 = 1.21780e−006 A 6 = −2.64845e−010 A 8 = 2.86812e−013
A10 = −4.48826e−017 A12 = −8.60791e−020 A14 = 2.03375e−022 A16 = −1.06956e−025
Nineteenth Surface K = 0.00000e+000 A 4 = −2.00533e−004 A 6 = 3.02920e−007 A 8 = 1.01782e−007
A10 = −1.29418e−009
Twentieth Surface K = 0.00000e+000 A 4 = −1.78885e−004 A 6 = 1.32062e−006 A 8 = 1.42777e−008
A10 = −2.23749e−010
Twenty-first surface K = 0.00000e+000 A 4 = 4.05416e−005 A6 = −1.62053e−007
Twenty-second surface K = 0.00000e+000 A 4 = 7.51999e−006 A 6 = 2.66833e−008 A 8 = 4.44532e−010
A10 = −1.62308e−012

VARIOUS DATA

| | |
|---|---|
| Focal length [mm] | 12.69 |
| F-number | 10.69 |
| Half angle of view [deg] | 67.76 |

TABLE 3

(NUMERICAL EXAMPLE 3)
UNIT mm surface data

| surface number | r | d | nd | vd |
|---|---|---|---|---|
| OB | | −304.98 | | |
| 1* | −34.307 | 28.00 | REF | |
| 2* | 16.505 | 4.86 | 1.69350 | 53.2 |
| 3 | 40.337 | 0.50 | | |
| 4 | 10.372 | 4.59 | 1.55332 | 71.7 |
| 5* | 9.013 | 4.98 | | |
| 6(diaphragm) | ∞ | 4.33 | | |
| 7 | −9242.947 | 7.18 | 1.59522 | 67.7 |
| 8 | −22.167 | 58.94 | | |
| 9* | −48.913 | −54.37 | REF | |

TABLE 3-continued (NUMERICAL EXAMPLE 3)
UNIT mm

| | | | | |
|---|---|---|---|---|
| 10* | 25.197 | 55.64 | REF | |
| 11 | −37.052 | 3.20 | 1.49700 | 81.5 |
| 12 | −14.038 | 0.50 | | |
| 13 | 77.681 | 3.64 | 1.49700 | 81.5 |
| 14 | −10.341 | 1.04 | 1.77250 | 49.6 |
| 15 | 191.197 | 0.50 | | |
| 16 | 19.333 | 4.20 | 1.49700 | 81.5 |
| 17 | −20.386 | 1.09 | | |
| 18* | 312.706 | 1.04 | 1.85135 | 40.1 |
| 19* | 21.367 | 3.08 | | |
| 20 | −13.946 | 5.77 | 1.59522 | 67.7 |
| 21 | −10.686 | 0.43 | | |
| 22* | 24.914 | 5.92 | 1.55332 | 71.7 |
| 23* | −61.523 | 2.40 | | |
| 24 | ∞ | 23.50 | 1.71700 | 47.9 |
| 25 | ∞ | 2.50 | | |
| 26 | ∞ | 1.10 | 1.51633 | 64.1 |
| 27 | ∞ | 0.41 | | |
| IM | ∞ | | | |

Aspheric data

First surface

K = −2.53621e−001 A 4 = 1.35915e−005 A 6 = −1.32086e−008 A 8 = 1.75042e−011
A10 = −1.49769e−014 A12 = 7.71084e−018 A14 = −1.57736e−021
Second surface K = 0.00000e+000 A 4 = −2.40178e−005 A 6 = −1.82548e−007 A 8 = −3.08432e−010
Fifth surface K = 0.00000e+000 A4 = −1.55960e−004 A 6 = −1.35345e−006 A 8 = 7.21085e−009
Ninth surface K = 3.85687e−001 A 4 = 3.93409e−007 A 6 = −7.44513e−011 A 8 = 4.02260e−013
A10 = −4.87095e−016 A12 = 3.32431e−019 A14 = −7.17698e−023
Tenth surface K = −5.96260e−001 A 4 = −6.22043e−006 A 6 = 8.16782e−009 A 8 = −1.35418e−011
A10 = 2.20121e−014 A12 = −2.53956e−017 A14 = 1.21016e−020
Eighteenth Surface K = 0.00000e+000 A 4 = −9.84261e−004 A 6 = 1.09156e−005 A 8 = −6.87416e−008
A10 = −2.33015e−010
Nineteenth Surface K = 0.00000e+000 A 4 = −9.09627e−004 A 6 = 1.37175e−005 A 8 = −1.17506e−007
A10 = 4.22956e−010
Twenty-second surface K = 0.00000e+000 A 4 = 6.34725e−005 A 6 = −6.33764e−007 A 8 = 2.24116e−009
A10 = −8.37571e−012
Twenty-third surface K = 0.00000e+000 A 4 = 1.00343e−004 A 6 = −5.55210e−007

VARIOUS DATA

| | |
|---|---|
| Focal length [mm] | 4.04 |
| F-number | 2.04 |
| Half angle of view [deg] | 66.56 |

Table 4 summarizes the values of the expressions (1) to (6) in each example, and Table 5 and Table 6 summarize the numerical values (unit is mm) in each expression.

TABLE 4

| | CONDITION | | | | | |
|---|---|---|---|---|---|---|
| | (1) | (2) | (3) | (4) | (5) | (6) |
| Example 1 | 1.47 | 0.63 | 1.29 | 1.37 | 0.24 | 0.38 |
| Example 2 | 2.58 | 0.69 | 0.82 | 2.04 | 0.30 | 0.98 |
| Example 3 | 1.52 | 0.66 | 1.28 | 1.36 | 0.31 | 0.61 |

TABLE 5

| | fM1 | fM2 | fM3 | fL1 |
|---|---|---|---|---|
| Example 1 | −30.621 | 42.532 | 20.896 | 45.143 |
| Example 2 | −20.740 | 21.568 | 17.965 | 53.491 |
| Example 3 | −17.153 | 24.456 | 12.599 | 26.018 |

TABLE 6

| | fL2 | DM1L1 | DM2M3 | DM1IM |
|---|---|---|---|---|
| Example 1 | 32.982 | 80.000 | 90.533 | 376.000 |
| Example 2 | 26.194 | 21.134 | 58.576 | 195.000 |
| Example 3 | 19.092 | 28.000 | 54.369 | 174.953 |

Example 4

Figure 10:
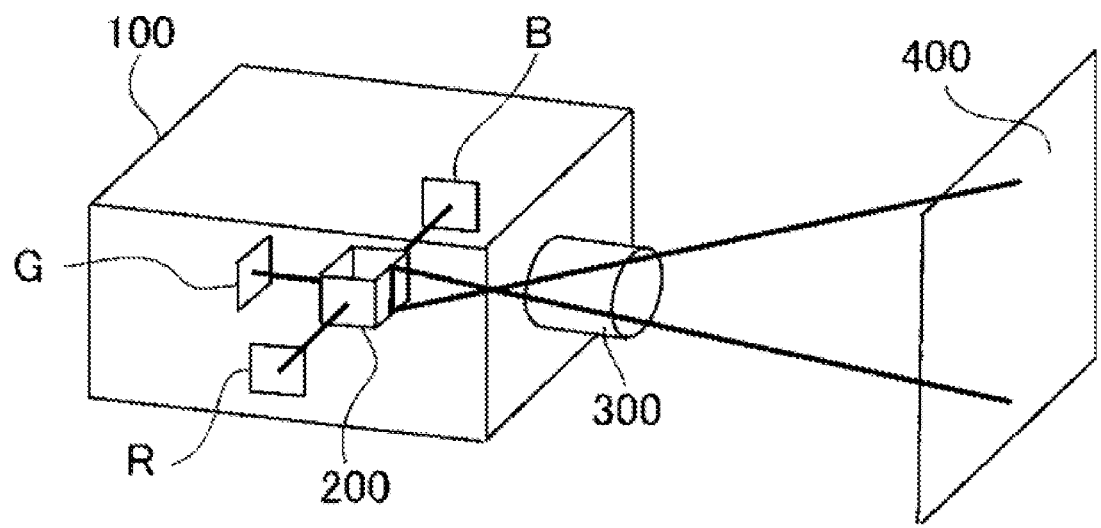
FIG. 10 illustrates a projector according to a fourth embodiment of the present invention.

FIG. 10 illustrates a projector as an image-projecting optical apparatus using the imaging optical system according to any one of Example 1 to 3.

The projector 100 has three liquid crystal display elements R, G, and B as light modulation elements for red, green, and blue separated from white light emitted from a light source. The projector 100 includes a prism 200 that combines three color light fluxes modulated by three liquid crystal display elements R, G, and B. The projector 100 projects three color lights combined into one light flux by the prism 200, onto a projection surface 400, such as a screen or the like, using a projection optical system 300 including the imaging optical system according to any of Examples 1 to 3. Each of the light modulation surfaces of the three liquid crystal display elements R, G, and B is disposed on the reduction side conjugate plane of the projection optical system 300.

The projection optical system 300 may be provided to an interchangeable lens (optical apparatus for the image projection), and the interchangeable lens may be attachable to and detachable from the projector.

Using the imaging optical system according to each example as the projection optical system in the projector can realize a compact image-projecting optical apparatus with a high optical performance.

Example 5

Figure 11:
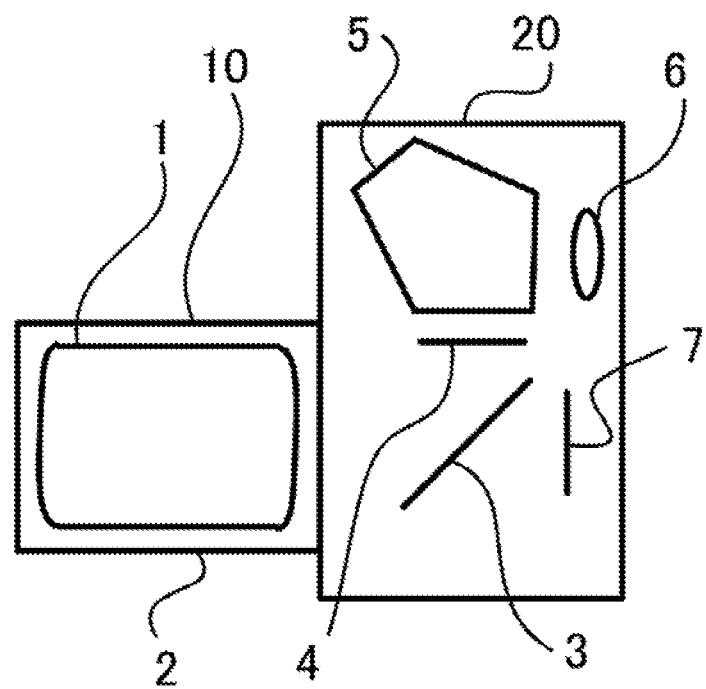
FIG. 11 illustrates a camera according to a fifth embodiment of the present invention.

FIG. 11 illustrates an interchangeable lens 10 as an imaging optical apparatus using the imaging optical system according to any one of Examples 1 to 3. The interchangeable lens 10 is detachably attached to a single-lens reflex digital camera 20 as an imaging apparatus. The interchangeable lens 10 has an imaging optical system including the imaging optical system according to any one of Examples 1 to 3. The imaging optical system is held by a lens barrel 2.

The camera 20 includes a quick return mirror 3 configured to reflect a light flux from the imaging optical system 1, and a focus screen 4 disposed at a position where the light flux reflected by the quick return mirror 3 forms an image. The camera 20 includes a penta dach prism 5 and an eyepiece 6 constituting a finder optical system used to observe an object image (optical image) formed on the focus screen 4.

The camera 20 includes an image sensor 7 that captures an object image formed by the imaging optical system 1 and outputs an image signal while the quick return mirror 3 is retracted to the outside of the optical path. The image sensor 7 includes a CCD sensor, a CMOS sensor, or the like. The imaging surface of the image sensor 7 is disposed on the reduction side conjugate plane of the imaging optical system 1.

The camera to which the interchangeable lens 10 is attached may be a mirrorless camera (nonreflex camera) having no quick return mirror 3. Alternatively, it may be a lens integrated camera (imaging optical apparatus, camera system) integrally including the imaging optical system 1 and the image sensor 7.

Using the imaging optical system according to each embodiment for an interchangeable lens or an imaging optical system of a camera can realize a compact imaging optical apparatus with a high optical performance.

Each of the embodiments can realize a compact imaging optical system which provides an image projection or imaging at a wide angle and a short projection or imaging distance and with a good optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-004641, filed on Jan. 16, 2018, which is hereby incorporated by reference herein in its entirety.

What is claimed is:

1. An imaging optical system comprising, in order from an enlargement conjugate side to a reduction conjugate side:
a first mirror as a convex mirror;
a first lens unit;
a second mirror as a concave mirror;
a third mirror as a concave mirror; and
a second lens unit,
wherein the imaging optical system is configured to form a first intermediate real image and a second intermediate real image located at a position different from that of the first intermediate real image between the first mirror and a reduction side conjugate plane.

2. The imaging optical system according to claim 1, wherein the first and second lens units are arranged on a common optical axis.

3. The imaging optical system according to claim 1, wherein at least one of the first and second lens units is a coaxial optical system including a plurality of lenses.

4. The imaging optical system according to claim 1, wherein at least one of the first and second intermediate real images is formed between the first lens unit and the second lens unit.

5. The imaging optical system according to claim 1, wherein the imaging optical system is configured to form the first and second intermediate real images between the second mirror and the third mirror.

6. The imaging optical system according to claim 1, wherein the following condition is satisfied:

$$0.50 \leq |fL1/fM1| \leq 5.00$$

where fM1 is a focal length of the first mirror and fL1 is a focal length of the first lens unit.

7. The imaging optical system according to claim 1, wherein the following condition is satisfied:

$$0.20 \leq |fM3/fL2| \leq 1.20$$

where fM3 is a focal length of the third mirror and fL2 is a focal length of the second lens unit.

8. The imaging optical system according to claim 1, wherein the following condition is satisfied:

$$0.30 \leq |fM2/fL2| \leq 1.70$$

where fM2 is a focal length of the second mirror and fL2 is a focal length of said second lens unit.

9. The imaging optical system according to claim 1, wherein the following condition is satisfied:

$$0.50 \leq fL1/fL2 \leq 2.70$$

where fL1 is a focal length of the first lens unit and fL2 is a focal length of the second lens unit.

10. The imaging optical system according to claim 2, wherein the following condition is satisfied:

$$0.10 \leq DM2M3/DM1IM \leq 0.60$$

where DM2M3 is a distance on the optical axis between the second mirror and the third mirror and DM1IM is a distance on the optical axis between the first mirror and the reduction side conjugate plane.

11. The imaging optical system according to claim 2, wherein the following condition is satisfied:

$$0.15 \leq |fM1/DM1L1| \leq 1.60$$

where DM1L1 is a distance on the optical axis between the first mirror and a lens surface closest to the enlargement conjugate side in the first lens unit.

12. The imaging optical system according to claim 1, wherein at least one of the first and second lens units has a diaphragm.

13. The imaging optical system according to claim 1, wherein at least one of the first, second, and third mirrors has an aspheric mirror surface.

14. An image projection apparatus comprising:
a light modulation element;
a light source configured to illuminate the light modulation element; and
a projection optical system configured to project light from the light modulation element disposed on a reduction conjugate plane onto a projection surface on an enlargement conjugate side,
wherein the projection optical system is an imaging optical system includes, in order from the enlargement conjugate side to a reduction conjugate side, a first mirror as a convex mirror, a first lens unit, a second mirror as a concave mirror, a third mirror as a concave mirror, and a second lens unit,
wherein the imaging optical system is configured to form a first intermediate real image and a second intermediate real image located at a position different from that of the first intermediate real image between the first mirror and the reduction side conjugate plane.

15. A camera system comprising:
an imaging surface;
an image sensor configured to hold the imaging surface; and
an imaging optical system configured to form an optical image on the imaging surface disposed on the reduction conjugate plane, and including, in order from the enlargement conjugate side to a reduction conjugate side, a first mirror as a convex mirror, a first lens unit, a second mirror as a concave mirror, a third mirror as a concave mirror, and a second lens unit,
wherein the imaging optical system is configured to form a first intermediate real image and a second intermediate real image located at a position different from that of the first intermediate real image between the first mirror and the reduction side conjugate plane.

* * * * *